US012671284B2

(12) United States Patent
Lin et al.

(10) Patent No.: US 12,671,284 B2
(45) Date of Patent: Jun. 30, 2026

(54) ELECTRIC MOTOR HAVING ADJUSTABLE MAGNETIC FIELD, AND VEHICLE

(71) Applicants: WUXI INFIMOTION PROPULSION TECHNOLOGY CO., LTD., Wuxi (CN); WUXI INFIMOTION TECHNOLOGY CO., LTD., Wuxi (CN)

(72) Inventors: Xiaozhe Lin, Wuxi (CN); Yanjun Tan, Wuxi (CN); Haisheng Yu, Wuxi (CN); Tao Han, Wuxi (CN); Zhen Wang, Wuxi (CN); Shengchuan Zhang, Wuxi (CN); Guojun Li, Wuxi (CN); Liangjun Ni, Wuxi (CN); Liangwei Guan, Wuxi (CN); Xuebo Xiong, Wuxi (CN); Yunyong Jing, Wuxi (CN); Liang Fang, Wuxi (CN)

(73) Assignees: WUXI INFIMOTION PROPULSION TECHNOLOGY CO., LTD., Wuxi (CN); WUXI INFIMOTION TECHNOLOGY CO., LTD., Wuxi (CN)

( * ) Notice: Subject to any disclaimer, the term of this patent is extended or adjusted under 35 U.S.C. 154(b) by 207 days.

(21) Appl. No.: 18/777,561

(22) Filed: Jul. 19, 2024

(65) Prior Publication Data

US 2024/0380260 A1 Nov. 14, 2024

Related U.S. Application Data

(63) Continuation of application No. PCT/CN2022/126188, filed on Oct. 19, 2022.

(30) Foreign Application Priority Data

May 13, 2022 (CN) .......................... 202210524253.3

(51) Int. Cl.
*H02K 1/278* (2022.01)
*H02K 16/02* (2006.01)

(52) U.S. Cl.
CPC ............. *H02K 1/278* (2013.01); *H02K 16/02* (2013.01); *H02K 2201/03* (2013.01); *H02K 2213/09* (2013.01)

(58) Field of Classification Search
CPC .... H02K 1/2766; H02K 1/2773; H02K 1/278; H02K 16/02; H02K 21/046; H02K 21/16;
(Continued)

(56) References Cited

U.S. PATENT DOCUMENTS 3,411,027 A * 11/1968 Heinz Rosenberg ........................ H02K 21/042
310/156.55
5,682,073 A 10/1997 Mizuno
(Continued)

FOREIGN PATENT DOCUMENTS

CN 102315739 A 1/2012
CN 111555493 A 8/2020
(Continued)

OTHER PUBLICATIONS

International Search Report dated Jan. 18, 2023 in International Application No. PCT/CN2022/126188. English translation attached.
(Continued)

*Primary Examiner* — Alex W Mok

(57) ABSTRACT

Provided are an electric motor having an adjustable magnetic field, and a vehicle. An excitation ring assembly of the electric motor includes an excitation ring having an outer ring wall and an inner ring wall and an excitation winding. An excitation rotor of the electric motor includes first permanent magnets and a rotor core provided with first and second magnetic pole forming sections that are circumfer-
(Continued)

entially arranged alternately, a first magnetic pole cooperating portion corresponding to the first magnetic pole forming section, and a second magnetic pole cooperating portion corresponding to the second magnetic pole forming section. The first permanent magnets correspond to the first and second magnetic pole forming sections. A second air gap is defined by the outer ring wall and the first magnetic pole cooperating portion and a third air gap is defined by the inner ring wall and the second magnetic pole cooperating portion.

20 Claims, 6 Drawing Sheets

(58) Field of Classification Search
CPC . H02K 2201/03; H02K 2213/09; Y02T 10/64
USPC ...................................................... 310/156.01
See application file for complete search history.

(56) References Cited

U.S. PATENT DOCUMENTS

| | | | | |
|---|---|---|---|---|
| 6,097,124 | A * | 8/2000 | Rao | H02K 21/22 |
| | | | | 310/168 |
| 6,492,756 | B1 | 12/2002 | Maslov et al. | |
| 6,972,504 | B1 * | 12/2005 | Hsu | H02K 21/046 |
| | | | | 310/191 |
| 7,129,611 | B2 * | 10/2006 | Hsu | H02K 21/046 |
| | | | | 310/191 |
| 7,518,278 | B2 * | 4/2009 | Hsu | H02K 21/046 |
| | | | | 310/191 |
| 9,083,225 | B2 * | 7/2015 | Tonogi | H02K 1/148 |
| 2004/0232794 | A1 * | 11/2004 | Hsu | H02K 21/046 |
| | | | | 310/156.56 |
| 2005/0258699 | A1 * | 11/2005 | Hsu | H02K 21/046 |
| | | | | 310/191 |
| 2009/0236924 | A1 * | 9/2009 | Hsu | H02K 21/046 |
| | | | | 310/156.53 |
| 2010/0019606 | A1 * | 1/2010 | Mizutani | H02K 21/046 |
| | | | | 310/181 |
| 2010/0213885 | A1 | 8/2010 | Ichiyama | |
| 2011/0204741 | A1 * | 8/2011 | Hsu | H02K 1/2766 |
| | | | | 310/156.53 |

FOREIGN PATENT DOCUMENTS

| | | |
|---|---|---|
| CN | 112671193 A | 4/2021 |
| CN | 114389422 A | 4/2022 |
| CN | 114844260 A | 8/2022 |
| JP | 47012826 A | 6/1972 |
| JP | 2000041367 A | 2/2000 |
| JP | 2008187826 A | 8/2008 |
| KR | 20200049343 A | 5/2020 |
| WO | 2014188505 A1 | 11/2014 |

OTHER PUBLICATIONS

First Office Action dated May 7, 2025 received in corresponding patent family application No. CN202210524253.3. English translation attached.
Extended European Search Report dated Mar. 27, 2025 received in corresponding European Application No. EP22941445.3.
Notice of Reasons for Refusal dated May 2, 2025 received in corresponding patent family application No. JP2024542012. English translation attached.
Decision to Grant dated Aug. 29, 2025 received in corresponding patent family application No. JP2024542012. English translation attached.
First Office Action dated Jan. 2, 2026 received in corresponding patent family application No. KR1020247024337. English translation attached.

* cited by examiner

ELECTRIC MOTOR HAVING ADJUSTABLE MAGNETIC FIELD, AND VEHICLE

CROSS-REFERENCE TO RELATED APPLICATION

This application is a continuation of International Application No. PCT/CN2022/126188, filed on Oct. 19, 2022, which claims priority to Chinese Patent Application No. 202210524253.3, titled "ELECTRIC MOTOR HAVING ADJUSTABLE MAGNETIC FIRLD, AND VEHICLE", and filed with China National Intellectual Property Administration on May 13, 2022, the entire contents of which are incorporated herein by reference.

FIELD

The present disclosure relates to but is not limited to vehicle technologies, and more particularly, to an electric motor having an adjustable magnetic field, and a vehicle.

BACKGROUND

A permanent magnet electric motor has received more and more attention due to its high torque density, high efficiency, lightweight, and miniaturization, and accordingly has been widely used in various fields. However, an air gap magnetic field (i.e., a magnetic field at a first air gap between a rotor and a stator) of the permanent magnet electric motor is provided by a permanent magnet steel, which is almost constant and difficult to be adjusted, which limits further development and application of the permanent magnet motor. Therefore, deep and extensive researches on the electric motor having an adjustable air gap magnetic field have been carried out.

Recently, electric motors of various structure, which have adjustable magnetic fields, such as such as a split magnetic pole type electric motor, a combined rotor type electric motor, an independent magnetic circuit type electric motor, or a double convex pole type electric motor have been successively proposed. In addition, a large number of deep researches have been carried out on a structure, an operating principle, and a magnetic circuit characteristic of the electric motor.

Since the air gap magnetic field is adjustable, the electric motor having the adjustable magnetic field can provide a higher output torque when a large torque is required at a low speed. In a high-speed operation region, a weak magnetic current when the permanent magnet electric motor adjusts the magnetic field can be eliminated, thus the efficiency is high. Meanwhile, the electric motor having the adjustable magnetic field can also be operated at a constant power in a wider range of speed. The electric motor having the adjustable magnetic field is especially suitable for constant power, wide adjustable speed drive, constant voltage power generation scenarios, and the like, and accordingly has a broad application prospect in aerospace, wind power generation, electric vehicle, and other fields.

Therefore, it is a technical problem to be solved by those skilled in the art on how to better achieve the advantages of the electric motor having the adjustable magnetic field, such as a high torque at a low speed, high efficiency at a high speed, and a wide range of the constant power operation.

SUMMARY

The following is a summary of the subject matter described in detail herein. The summary is not intended to limit the scope of the claims.

An electric motor having an adjustable magnetic field according to embodiments of the present disclosure includes a housing, a stator, a permanent magnet rotor, an excitation rotor, and an excitation ring assembly. Each of the stator, the permanent magnet rotor, the excitation rotor, and the excitation ring assembly is located in the housing. The permanent magnet rotor is disposed at a radial inner side of the stator. A first air gap is formed between the permanent magnet rotor and the stator. The excitation ring assembly is disposed at an end wall of the housing. The excitation rotor is disposed between the excitation ring assembly and the permanent magnet rotor. The excitation ring assembly includes an excitation ring and an excitation winding. The excitation ring has an outer ring wall and an inner ring wall. The excitation winding is disposed between the outer ring wall and the inner ring wall. The excitation rotor includes a rotor core and a plurality of first permanent magnets. The rotor core is provided with a first magnetic pole cooperating portion, a second magnetic pole cooperating portion, a first magnetic pole forming section, and a second magnetic pole forming section. The first magnetic pole forming section and the second magnetic pole forming section are circumferentially arranged alternately. The first magnetic pole cooperating portion corresponds to the first magnetic pole forming section. The second magnetic pole cooperating portion corresponds to the second magnetic pole forming section.

The plurality of first permanent magnets corresponds to the first magnetic pole forming section and the second magnetic pole forming section and is arranged on the rotor core to allow the first magnetic pole forming section to be formed as a first magnetic pole and allow the second magnetic pole forming section to be formed as a second magnetic pole. The outer ring wall corresponds to the first magnetic pole cooperating portion. A second air gap is defined by the outer ring wall and the first magnetic pole cooperating portion. The inner ring wall corresponds to the second magnetic pole cooperating portion. A third air gap is defined by the inner ring wall and the second magnetic pole cooperating portion.

In an exemplary embodiment, the outer ring wall is located at a radial inner side of the first magnetic pole cooperating portion. The second air gap is located between a radial outer surface of the outer ring wall and a radial inner surface of the first magnetic pole cooperating portion. The inner ring wall is located at a radial inner side of the second magnetic pole cooperating portion. The third air gap is located between a radial outer surface of the inner ring wall and a radial inner surface of the second magnetic pole cooperating portion. Each of the plurality of first permanent magnets includes a tangential permanent magnet steel arranged between the first magnetic pole forming section and the second magnetic pole forming section.

In an exemplary embodiment, the first magnetic pole forming section and the second magnetic pole forming section are both located at a side surface of the rotor core facing towards the excitation ring assembly. The inner ring wall protrudes towards the rotor core relative to the outer ring wall. The first magnetic pole cooperating portion is disposed at an end surface of the first magnetic pole forming section. The second magnetic pole cooperating portion is disposed at a radial inner surface of the second magnetic pole forming section.

In an exemplary embodiment, the outer ring wall is opposed to the first magnetic pole cooperating portion in an axial direction of the housing. The second air gap is located between an end surface of the outer ring wall and an end surface of the first magnetic pole cooperating portion. The inner ring wall is opposed to the second magnetic pole cooperating portion in the axial direction of the housing. The third air gap is located between an end surface of the inner ring wall and an end surface of the second magnetic pole cooperating portion. Each of the plurality of first permanent magnet includes a first radial permanent magnet steel. In a circumferential direction of the housing, the first magnetic pole forming section and the second magnetic pole forming section are in one-to-one correspondence and located inside a region defined by a plurality of first radial permanent magnet steels.

In an exemplary embodiment, the first magnetic pole forming section is provided with a magnetism isolation structure at a radial inner side of the first magnetic pole forming section. The second magnetic pole forming section is provided with a magnetism passing structure at a radial inner side of the second magnetic pole forming section.

In an exemplary embodiment, the first magnetic pole forming section and the second magnetic pole forming section are both located at a side surface of the rotor core facing towards the excitation ring assembly. The first magnetic pole cooperating portion is disposed at an end surface of the first magnetic pole forming section. The second magnetic pole cooperating portion is disposed at a side surface of the rotor core facing towards the excitation ring assembly, and is located at radial inner sides of the first magnetic pole forming section and the second magnetic pole forming section.

In an exemplary embodiment, the end surface of the first magnetic pole cooperating portion is flush or non-flush with the end surface of the second magnetic pole cooperating portion. The end surface of the inner ring wall is flush or non-flush with the end surface of the outer ring wall.

In an exemplary embodiment, the first magnetic pole cooperating portion includes a first magnetic pole protrusion. The second magnetic pole cooperating portion includes a second magnetic pole protrusion.

In an exemplary embodiment, the permanent magnet rotor includes a permanent magnet rotor core and a second permanent magnet. The second permanent magnet is arranged on the permanent magnet rotor core, and the second permanent magnet is a second radial permanent magnet steel. A magnetism isolation structure is arranged at each position where a first magnetic pole and a second magnetic pole of the second radial permanent magnet steel at radial inner ends of the second radial permanent magnet steel are located.

In an exemplary embodiment, two excitation ring assemblies are provided, and two excitation rotors are provided. The permanent magnet rotor is located between the two excitation rotors, and the two excitation rotors are located between the two excitation ring assemblies.

A vehicle according to embodiments of the present disclosure includes the electric motor according to any one of the embodiments described above.

Additional features and advantages of the present disclosure will be given in the following description, or become apparent at least in part from the following description of the specification, or can be learned from practicing of the embodiments of the present disclosure. Other advantages of the present disclosure may be realized and obtained by the aspects described in the specification and the accompanying drawings.

Other aspects will become apparent upon reading and understanding the accompanying drawings and detailed descriptions.

Figure 1:
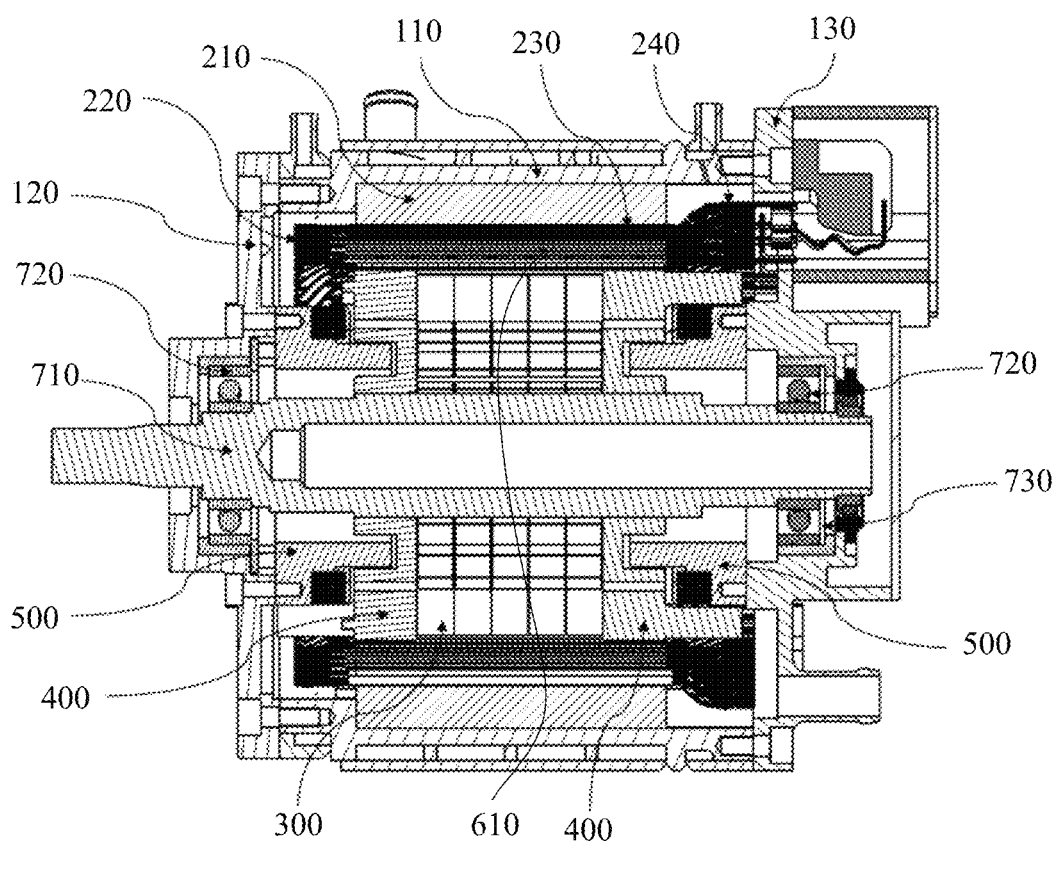
FIG. 1 is a schematic structural sectional view showing an electric motor having an adjustable magnetic field according to an embodiment of the present disclosure.

Correspondences between reference numerals and names of components in FIG. 1 to FIG. 12 are as follows:

110 casing; 120 first end cover; 130 second end cover; 210 stator core; 220 first end winding; 230 stator winding; 240 second end winding; 300 permanent magnet rotor; 310 permanent magnet rotor core; 320 second radial permanent magnet steel; 321 first magnetic pole of a second radial permanent magnet steel at a radial outer end thereof; 322 second magnetic pole of a second radial permanent magnet steel at a radial outer end thereof; 400 excitation rotor; 410 rotor core; 411 first boss; 412 second boss; 413 first magnetic pole protrusion; 414 second magnetic pole protrusion; 420 tangential permanent magnet steel; 430 first radial permanent magnet steel; 500 excitation ring assembly; 510 excitation ring; 511 outer ring wall; 512 inner ring wall; 520 excitation winding; 610 first air gap; 620 second air gap; 630 third air gap; 640 magnetism isolation structure; 650 magnetism passing structure; 710 rotary shaft; 720 bearing; 730 wave spring.

DETAILED DESCRIPTION OF THE EMBODIMENTS

Although various embodiments of the present disclosure will be described below, the embodiments are merely exemplary and cannot be construed as limitations of the present disclosure. To make the objects, technical solutions, and advantages of the present disclosure clearer, the embodiments of the present disclosure will be described in detail hereinafter with reference to the accompanying drawings. It should be noted that embodiments in the present disclosure and features in the embodiments can be combined with each other without conflict.

As shown in FIG. 1 to FIG. 4, an electric motor having an adjustable magnetic field according to embodiments of the present disclosure includes a housing, a stator, a permanent magnet rotor 300, an excitation rotor 400, and an excitation ring assembly 500. Each of the stator, the permanent magnet rotor 300, the excitation rotor 400, and the excitation ring assembly 500 is located in the housing. The permanent magnet rotor 300 is disposed at a radial inner side of the stator. A first air gap 610 is formed between the permanent magnet rotor 300 and the stator. The excitation ring assembly 500 is disposed at an end wall of the housing. The excitation rotor 400 is disposed between the excitation ring assembly 500 and the permanent magnet rotor 300. The excitation ring assembly 500 includes an excitation ring 510 and an excitation winding 520. The excitation ring 510 has an outer ring wall 511 and an inner ring wall 512. The excitation winding 520 is disposed between the outer ring wall 511 and the inner ring wall 512. The excitation rotor 400 includes a rotor core 410 and a plurality of first permanent magnets. The rotor core 410 is provided with a first magnetic pole cooperating portion, a second magnetic pole cooperating portion, a first magnetic pole forming section, and a second magnetic pole forming section. The first magnetic pole forming section and the second magnetic pole forming section are circumferentially arranged alternately. The first magnetic pole cooperating portion corresponds to the first magnetic pole forming section. The second magnetic pole cooperating portion corresponds to the second magnetic pole forming section. The plurality of first permanent magnets corresponds to the first magnetic pole forming section and the second magnetic pole forming section and is arranged on the rotor core 410 to allow the first magnetic pole forming section to be formed as a first magnetic pole and allow the second magnetic pole forming section to be formed as a second magnetic pole. The outer ring wall 511 corresponds to the first magnetic pole cooperating portion, and a second air gap 620 is defined by the outer ring wall 511 and the first magnetic pole cooperating portion. The inner ring wall 512 corresponds to the second magnetic pole cooperating portion, and a third air gap 630 is defined by the inner ring wall 512 and the second magnetic pole cooperating portion.

In the electric motor having the adjustable magnetic field, a main magnetic field is generated by the first permanent magnet of the excitation rotor 400 and the permanent magnet rotor 300, an auxiliary adjustable magnetic field is generated by a current of the excitation winding 520 of the excitation ring assembly 500, and assisting magnetization and demagnetization are determined based on a magnitude and direction of the current of the excitation winding 520 i.e., based on a magnitude and direction of the adjustable magnetic field. Therefore, an adjustment and control on the main magnetic field can be achieved. As a result, advantages such as high torque at a low speed, high efficiency at a high speed, and a wide operation range at a constant power can be better achieved.

Figure 3:
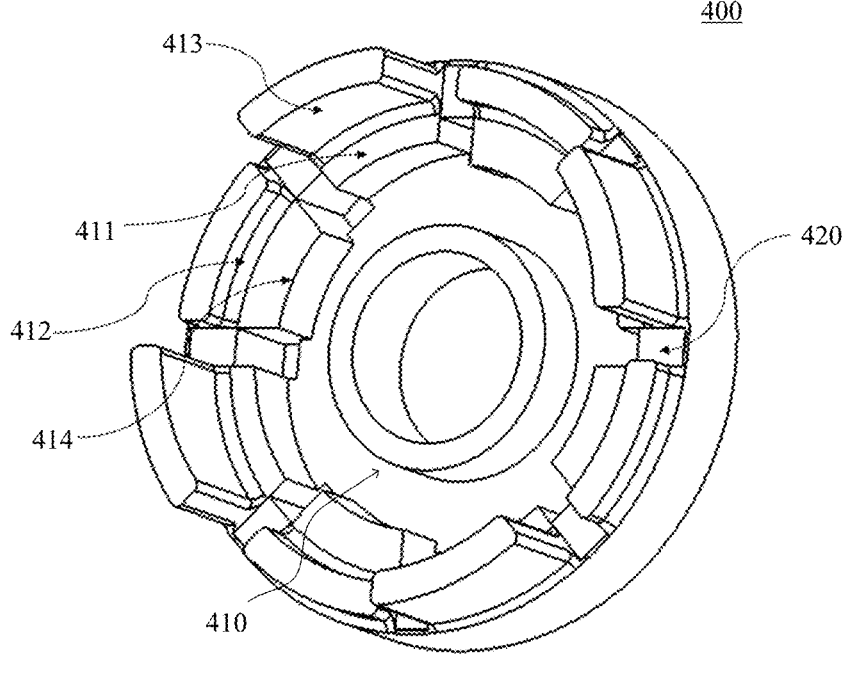
FIG. 3 is a schematic structural view of an excitation rotor structure in FIG. 1.
Figure 4:
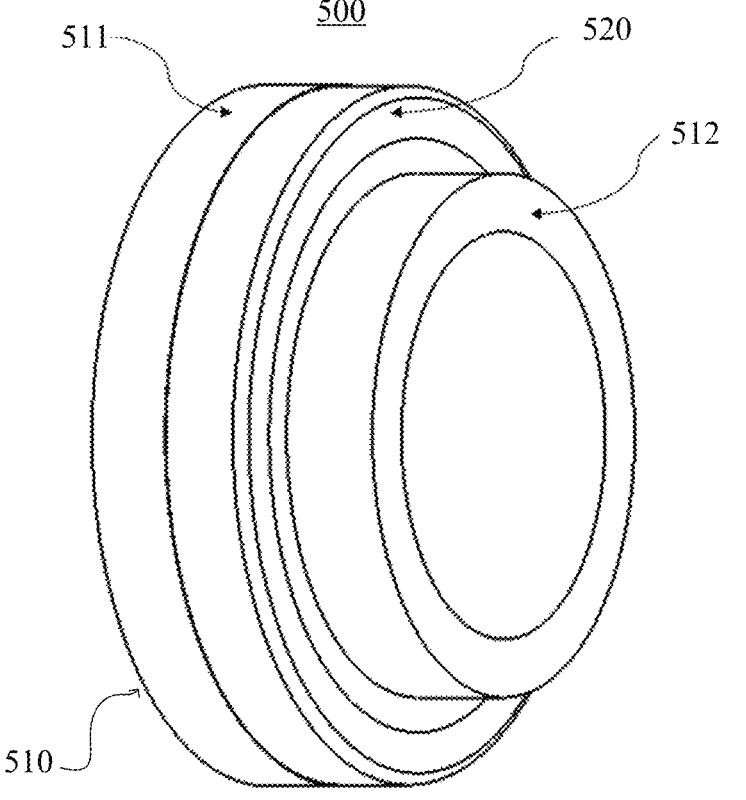
FIG. 4 is a schematic structural view of an excitation ring assembly in FIG. 1.

In an exemplary embodiment, as shown in FIG. 1, FIG. 3, and FIG. 4, the outer ring wall 511 is located at a radial inner side of the first magnetic pole cooperating portion. The second air gap 620 is located between a radial outer surface of the outer ring wall 511 and a radial inner surface of the first magnetic pole cooperating portion. The inner ring wall 512 is located at a radial inner side of the second magnetic pole cooperating portion. The third air gap 630 is located between a radial outer surface of the inner ring wall 512 and a radial inner surface of the second magnetic pole cooperating portion. The first permanent magnet is a tangential permanent magnet steel 420. The tangential permanent magnet steel 420 is arranged between the first magnetic pole forming section and the second magnetic pole forming section. The second air gap 620 and the third air gap 630 each are a radial air gap. In the circumferential direction of housing, the first permanent magnet has an end formed as a first magnetic pole and another end formed as a second magnetic pole. Further, two circumferentially adjacent tangential permanent magnet steels 420 are arranged in such a way that N poles are opposite to each other and S poles are opposite to each other. That is, permanent magnet polarity at two sides of each magnetic pole is same. The circumferential, axial, and radial directions are referenced to the housing.

In an example, as shown in FIG. 3, the first magnetic pole forming section is a first boss 411, and the second magnetic pole forming section is a second boss 412. The first boss 411 and the second boss 412 are both located at a side surface of the rotor core 410 facing towards the excitation ring assembly 500. The inner ring wall 512 protrudes towards the rotor core 410 relative to the outer ring wall 511. The first magnetic pole cooperating portion is a first magnetic pole protrusion 413. The second magnetic pole cooperating portion is a second magnetic pole protrusion 414. The first magnetic pole protrusion 413 is disposed at an end surface of the first boss 411. The second magnetic pole protrusion 414 is disposed at a radial inner surface of the second boss 412. The first boss 411 and the second boss 412 may be formed by pressing a soft magnetic composite material, or may be processed from a magnetically conductive material such as No. 10 steel, or may be laminated from a silicon steel sheet, or may be composite-laminated from the above materials, all of which are simple to be manufactured, convenient, and of lower cost. The rotor core 410 may be composite-laminated from No. 10 steel and silicon steel sheet to form a 3D axial magnetic circuit and a 2D axial magnetic circuit that are connected and conductive to each other, thereby fully utilizing the lamination of the silicon steel sheets to remove the eddy current effect.

In an example, as shown in FIG. 1, two excitation ring assemblies 500 and two excitation rotors 400 are provided. The permanent magnet rotor 300 is located between the two excitation rotors 400. The two excitation rotors 400 are located between the two excitation ring assemblies 500. In this way, the auxiliary adjustable magnetic field can be generated better by a current of the excitation winding 520, and the assisting magnetization and the demagnetization are determine based on a magnitude and direction of the current of the excitation winding 520. Therefore, the adjustment and control on the main magnetic field can be achieved. As a result, advantages such as the high torque at the low speed, the high efficiency at the high speed, and the wide operation range at the constant power can be better achieved.

Figure 2:
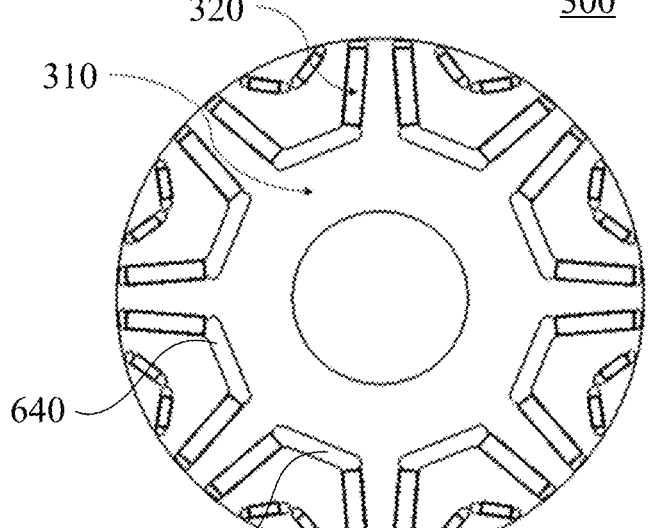
FIG. 2 is a schematic structural view of a permanent magnet rotor in FIG. 1.

In an example, as shown in FIG. 2, the permanent magnet rotor 300 includes a permanent magnet rotor core 310 and a plurality of second permanent magnets. The plurality of second permanent magnets are circumferentially arranged on the permanent magnet rotor core 310 sequentially. The second permanent magnet is a second radial permanent magnet steel 320. Radial outer ends of adjacent second radial permanent magnet steels 320 have different magnetic poles, and radial inner ends of the adjacent second radial permanent magnet steels 320 have different magnetic poles. Further, a magnetism isolation structure 640 is disposed at each position where a first magnetic pole and a second magnetic pole of the adjacent second radial permanent magnet steels 320 at radial inner ends of the adjacent second radial permanent magnet steels 320 are located. The magnetic isolation structure 640 may be formed as a magnetic isolation groove. The second radial permanent magnet steel 320 may be formed as a V-shaped permanent magnet steel, a double V-shaped permanent magnet steel, a U-shaped permanent magnet steel, or the like. The permanent magnet rotor core 310 is formed by stamping and laminating silicon steel sheets. The permanent magnet rotor 300 may be constructed by using a double V-permanent magnet steel, which allows for a full utilization of reluctance torque.

The main magnetic field is generated by the first permanent magnet of the excitation rotor 400 and a second permanent magnet of the permanent magnet rotor 300, the auxiliary adjustable magnetic field is generated by the current of the excitation winding 520 of the excitation ring assembly 500, and the assisting magnetization and the demagnetization are determined based on the magnitude and direction of the current of the excitation winding 520 i.e., based on the magnitude and direction of the adjustable magnetic field. Therefore, the adjustment and control on the main magnetic field can be achieved. As a result, advantages such as the high torque at the low speed, the high efficiency at the high speed, and the wide operation range at the constant power can be better achieved.

In an example, as shown in FIG. 1, the housing includes a casing 110, a first end cover 120, and a second end cover 130 that are assembled together. The stator includes a stator core 210, a first end winding 220 disposed at the stator core 210, a stator winding 230, and a second end winding 240. The permanent magnet rotor 300 and the excitation rotor 400 are both arranged on a rotary shaft 710. A bearing 720 and a wave spring 730 are provided between the rotary shaft 710 and the first end cover 120 and between the rotary shaft 710 and the second end cover 130, respectively.

The excitation ring assembly 500 makes full use of a space at two ends of the stator winding 230 in the housing. Therefore, the electric motor having the adjustable magnetic field has a compact structure, effectively improving a space utilization ratio of the electric motor having the adjustable magnetic field. Therefore, more output can be realized with the smallest volume, which facilitates increasing a power density and torque density of the electric motor having the adjustable magnetic field. In addition, the excitation winding 520 is fixed on the excitation ring 510, and the two excitation rings 510 are correspondingly fixed on the first end cover 120 and the second end cover 130, thereby eliminating the need for brushes and slip rings and increasing reliability of the electric motor having the adjustable magnetic field. Moreover, the rotor core 410 and the excitation ring 510 may be manufactured with different materials and processes. For example, the rotor core 410 is formed by laminating silicon steel sheets, which have a low iron loss at a low frequency. The excitation ring 510 is formed by directly molding soft magnetic composite materials, which is simple, convenient, and low-cost. Moreover, the soft magnetic composite material has a low iron loss at a high frequency, which contributes to balancing and increasing efficiency in an entire rotational speed range.

A detailed description will be given below by taking an example in which the first magnetic pole is an N pole and the second magnetic pole is an S pole. In some other embodiments of the present disclosure, the first magnetic pole may be the S pole and the second magnetic pole may be the N pole, which can also achieve the object of the present disclosure, and the purpose thereof does not depart from the design idea of the present disclosure. Thus, details of those embodiments will be omitted herein, and should also fall within the scope of the present disclosure.

Figure 5:
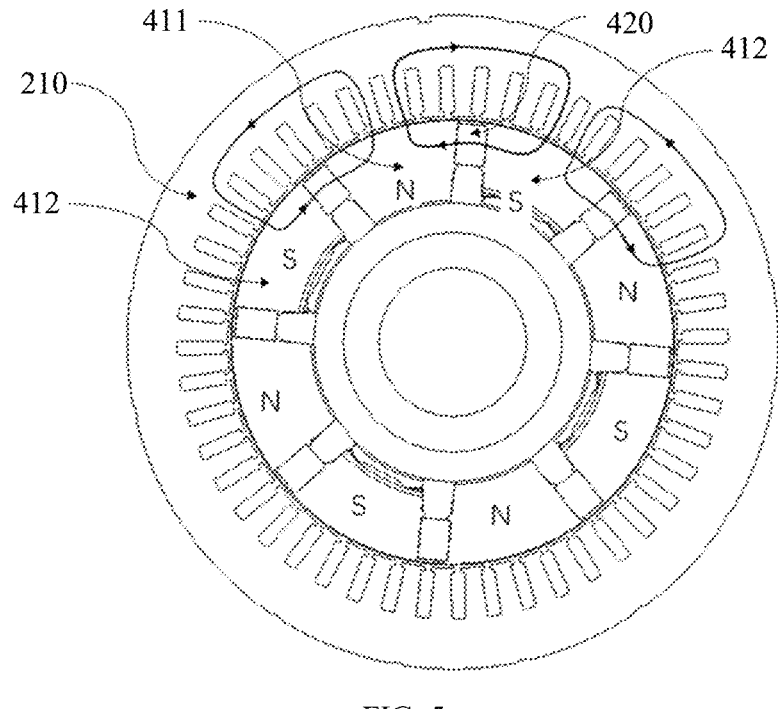
FIG. 5 is a structure structural view of a main magnetic flux path of an excitation rotor.

When the excitation winding 520 is not energized, a part of permanent magnetic flux generated by the tangential permanent magnet steel 420 on the excitation rotor 400 passes through the first boss 411 from one side (the N pole)

of the tangential permanent magnet steel 420, then as shown in FIG. 5 passes through the first air gap 610, a stator tooth portion, a stator yoke portion, an adjacent stator tooth portion, and the first air gap 610 to reach an adjacent second boss 412, and finally reaches the other side (the S pole) of the tangential permanent magnet steel 420, thereby forming a closed magnetic circuit loop. Another part of the permanent magnetic flux generated by the tangential permanent magnet steel 420 passes through the first boss 411 from one side (the N pole) of the tangential permanent magnet steel 420, then along a magnetic flux path shown in FIG. 6 passes through the first magnetic pole protrusion 413, the second air gap 620, the outer ring wall 511, the inner ring wall 512, the third air gap 630, the second magnetic pole protrusion 414 to reach the second boss 412, and finally reaches the other side (the S pole) of the tangential permanent magnet steel 420, thereby forming a closed magnetic circuit loop.

Figure 7:
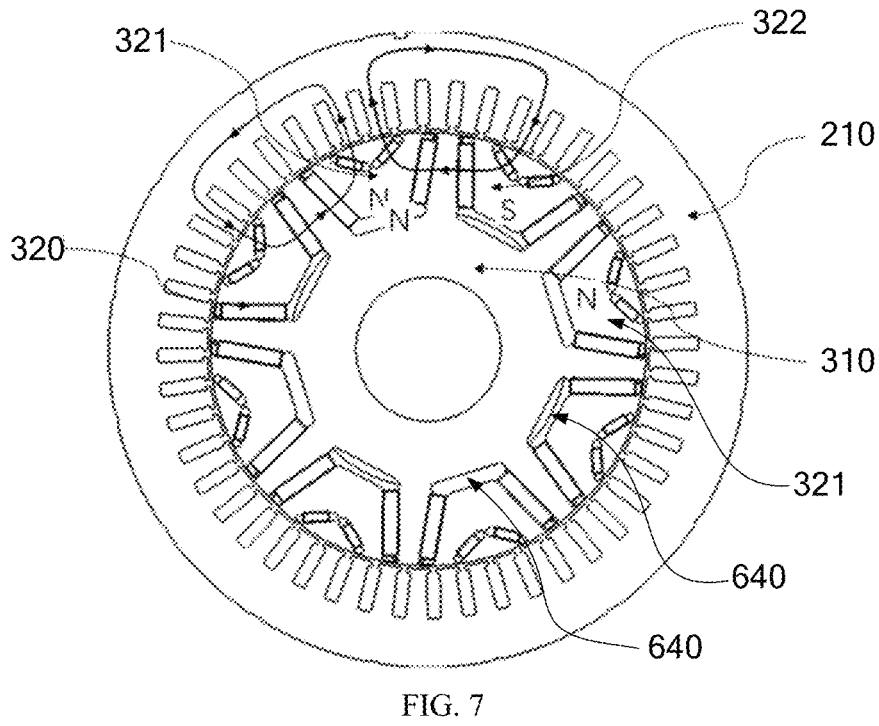
FIG. 7 is a schematic structural view of a main magnetic flux path of a permanent magnet rotor.

When the excitation winding 520 is not energized, as shown in FIG. 7, from a first magnetic pole 321 of the second radial permanent magnet steel 320 at a radial outer end thereof, a part of magnetic flux generated by the second radial permanent magnet steel 320 on the permanent magnet rotor 300 passes through the first air gap 610, the stator tooth portion, the stator yoke portion, the adjacent stator tooth portion, and the first air gap 610 to reach a second magnetic pole 322 of the adjacent second radial permanent magnet steel 320 at an radial outer end thereof, and then passes through the rotor yoke portion of the permanent magnet rotor 300, thereby forming a closed magnetic circuit loop, and another part of the magnetic flux passes through the first boss 411, the first magnetic pole protrusion 413, the second air gap 620, the outer ring wall 511, the inner ring wall 512, the third air gap 630, and the second magnetic pole protrusion 414 to reach the second boss 412, and then passes through the second magnetic pole at the radial inner end of the second radial permanent magnet steel 320 and the rotor yoke portion of the permanent magnet rotor 300, thereby forming a closed magnetic circuit loop (not shown).

Magnetic flux passing through the second air gap 620 and the third air gap 630 is leakage magnetic flux. A magnetic flux path extending through the second air gap 620 and the third air gap 630 is a leakage magnetic flux path. Magnetic flux passing through the first air gap 610 participates in external energy conversion and outputs torque to an external environment. In addition, the magnetic flux (i.e. leakage magnetic flux) passing through the second air gap 620 and the third air gap 630 does not participate in the external energy conversion, and does not output the torque to the external environment. Herein, the setting may be adjusted as desired to allow both the second air gap 620 and the third air gap 630 to be smaller than the first air gap 610. Based on a principle of magnetic resistance minimization, a larger part of the permanent magnetic flux is closed through the leakage magnetic flux path. In some other embodiments, settings are adjusted as desired to allow the second air gap 620 and the third air gap 630 to be greater than or equal to the first air gap 610. Those skilled in the art may make reasonable settings as desired. The electric motor having adjustable magnetic flux according to the embodiments of the present disclosure can provide a normally open leakage magnetic flux path to allow the permanent magnetic flux generated by the tangential permanent magnet steel 420 of the excitation rotor 400 and permanent magnetic flux generated by the second radial permanent magnet steel 320 of the permanent magnet rotor 300 to be discharged through the leakage magnetic flux path.

Figure 8:
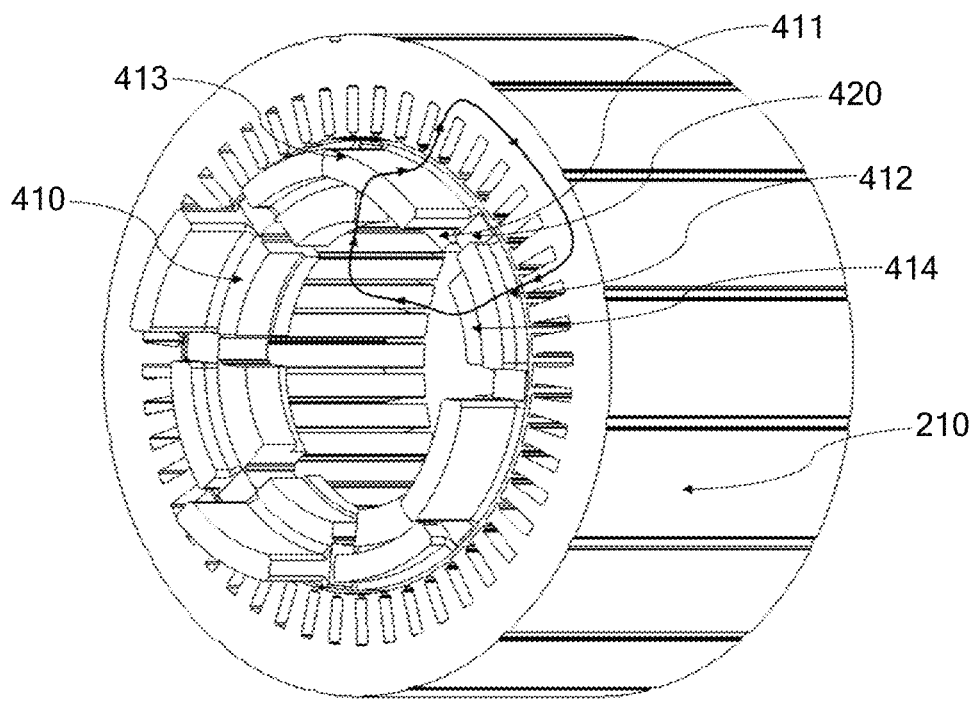
FIG. 8 is a schematic structural view of an assisting magnetization magnetic flux path of an excitation rotor.

When the excitation winding 520 is energized forwardly to form the outer ring wall 511 as the first magnetic pole, on the one hand, a magnetic field generated by an excitation current of the excitation winding 520 will inhibit the leakage magnetic flux path, which is equivalent to controlling and adjusting an opening size of the normally open leakage magnetic flux path. When the excitation current is relatively large, the leakage magnetic flux path is closed. On the other hand, as shown in FIG. 8, the magnetic flux generated by the excitation current passes through the outer ring wall 511, the second air gap 620, the first magnetic pole protrusion 413, the first boss 411, the first air gap 610, the stator tooth potion, the stator yoke portion, the adjacent stator tooth portion, the first air gap 610, the second boss 412, the second magnetic pole protrusion 414, the third air gap 630, and the inner ring wall 512 to reach the outer ring wall 511, thereby forming a closed magnetic circuit loop. In this case, for the first air gap 610, a magnetic field direction of the magnetic flux generated by the excitation current is the same as a magnetic field direction of the permanent magnetic flux generated by the tangential permanent magnet steel 420 of the excitation rotor 400, thereby providing magnetization increasing. In this way, a torque output is greatly improved, which is especially suitable for a low-speed operation condition.

Figure 9:
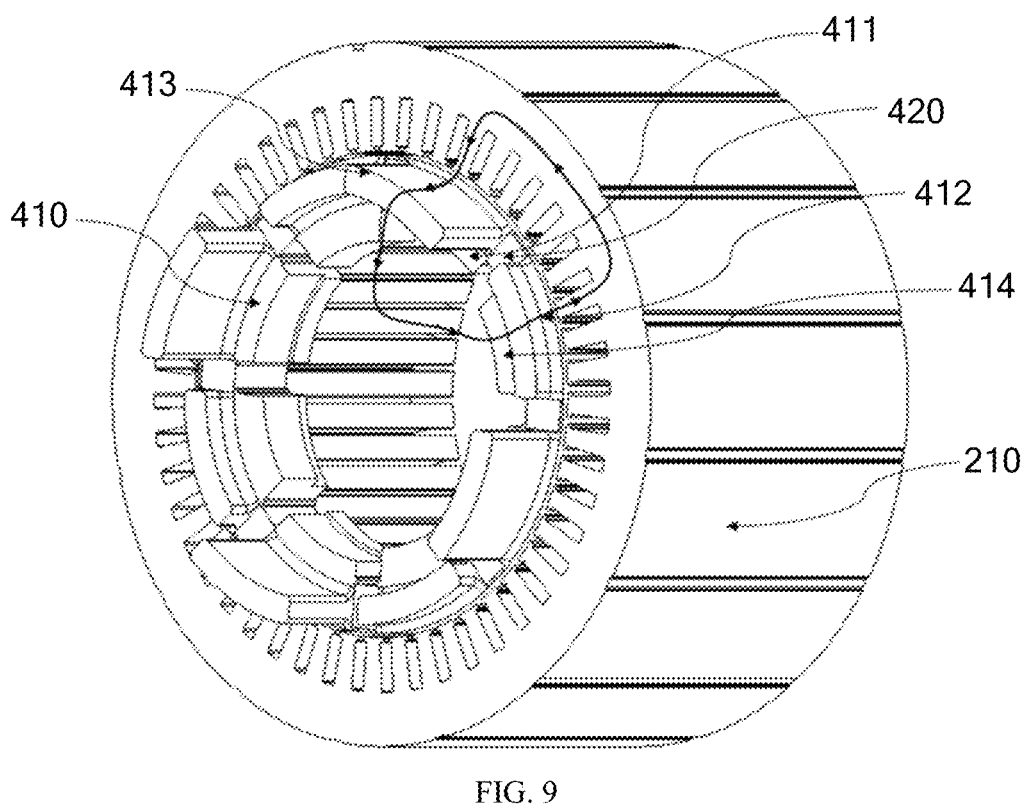
FIG. 9 is a schematic structural view of a demagnetization magnetic flux path of an excitation rotor.

When the excitation winding 520 is energized reversely to form the outer ring wall 511 as the second magnetic pole, on the one hand, the leakage magnetic flux path is widened and expanded by the magnetic field generated by the excitation current, and therefore the opening size of the leakage magnetic flux path becomes larger, and more permanent magnetic flux passes through the leakage magnetic flux path, thereby forming a closed magnetic circuit loop. On the other hand, as shown in FIG. 9, the magnetic flux generated by the excitation current passes through the inner ring wall 512, the third air gap 630, the second magnetic pole protrusion 414, the second boss 412, the first air gap 610, the stator tooth portion, the stator yoke portion, the adjacent stator tooth portion, the first air gap 610, the first boss 411, the first magnetic pole protrusion 413, the second air gap 620, and the outer ring wall 511 to reach the inner ring wall 512, thereby forming a closed magnetic circuit loop. In this case, for the first air gap 610, the magnetic field generated by the excitation current (generated by the excitation winding) has an opposite direction to the permanent magnetic field generated by the permanent magnetic flux (generated by the tangential permanent magnet steel) of the excitation rotor 400, thereby providing the demagnetization. In this way, the main magnetic flux (i.e. the permanent magnetic flux) passing through the first air gap 610 is further reduced, realizing further adjustment of the magnetic field in the first air gap 610, which is especially suitable for an ultra-high speed operation condition.

By energizing the excitation winding 520 of the excitation ring assembly 500, the electric motor having the adjustable magnetic field realizes the opening and closing of the leakage magnetic flux path and the adjustment of the opening size of the leakage magnetic flux path, which indirectly realizes the adjustment of the magnetic field at the first air gap 610. When a high torque output is required at a low speed, the excitation current is a forward current, and the excitation current provides the magnetization increasing to improve the intensity of the magnetic field at the first air gap 610, thereby further improving the output torque. At a high speed, the leakage magnetic flux path may be normally opened as desired, for example, when a zero excitation current is required. In this case, the permanent magnetic flux of the permanent magnet rotor 300 and the permanent magnetic flux of the excitation rotor 400 are discharged through the leakage magnetic flux path to reduce the magnetic flux passing through the first air gap 610. In this way, the main magnetic flux passing through the first air gap 610 is weakened without any input current, thereby completing the weakening of the permanent magnetic flux passing through the first air gap 610 without external input. Therefore, the electric motor can operates more efficiently (i.e. when the excitation current is zero, the permanent magnetic flux of permanent magnet rotor 300 and the permanent magnetic flux of excitation rotor 400 pass through the leakage magnetic flux path, which split the main magnetic flux passing through the first air gap 610, thereby indirectly realizing the weakening of the main magnetic flux passing through the first air gap 610, that is, the weakening of the main magnetic flux is realized when the excitation current is zero, which facilitates improving operation efficiency in a high-speed region). When a rotation speed is further increased, the excitation current is a reverse current, and the excitation current provides the demagnetization, which further weakens the magnetic flux passing through the first air gap 610, thereby realizing the weakening of the magnetic flux. In this way, an operating range of the electric motor can be significantly improved, realizing a constant power operation in a wide speed regulation range.

In the electric motor having the adjustable magnetic field, the main magnetic flux passing through the first air gap 610 can be adjusted by adjusting the magnitude of the leakage magnetic flux passing through the second air gap 620 and the third air gap 630. When high torque is required at the low speed, the excitation current provides the assisting magnetization to increase the main magnetic flux passing through the first air gap 610 to, realizing high torque output at the low speed. At a high speed, the excitation current is zero, and thus the leakage magnetic flux path is opened, and the main magnetic flux passing through the first air gap 610 is weakened without the external input. At an ultra-high speed, the excitation current of the excitation winding 520 provides reverse magnetic flux, further realizing the weakening of the main magnetic flux through the first air gap 610. In this way, the operating speed range of the electric motor is greatly improved, realizing the constant power operation in the wide speed regulation range.

Figure 10:
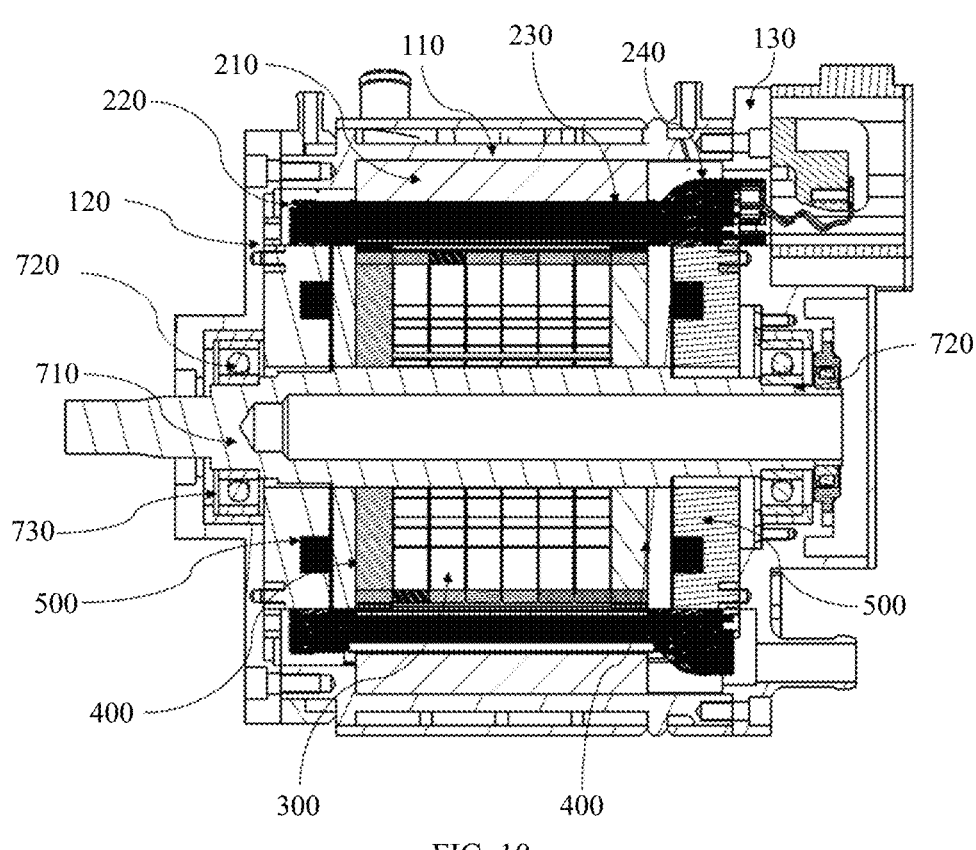
FIG. 10 is a schematic structural sectional view of an electric motor having an adjustable magnetic field according to another embodiment of the present disclosure.
Figure 11:
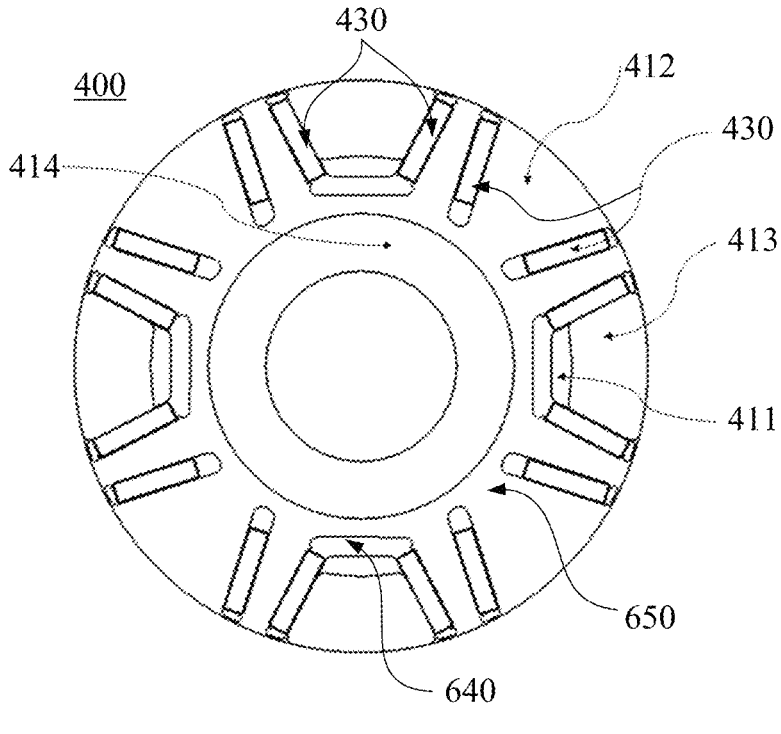
FIG. 11 is a schematic structural view of an excitation rotor in FIG. 10.
Figure 12:
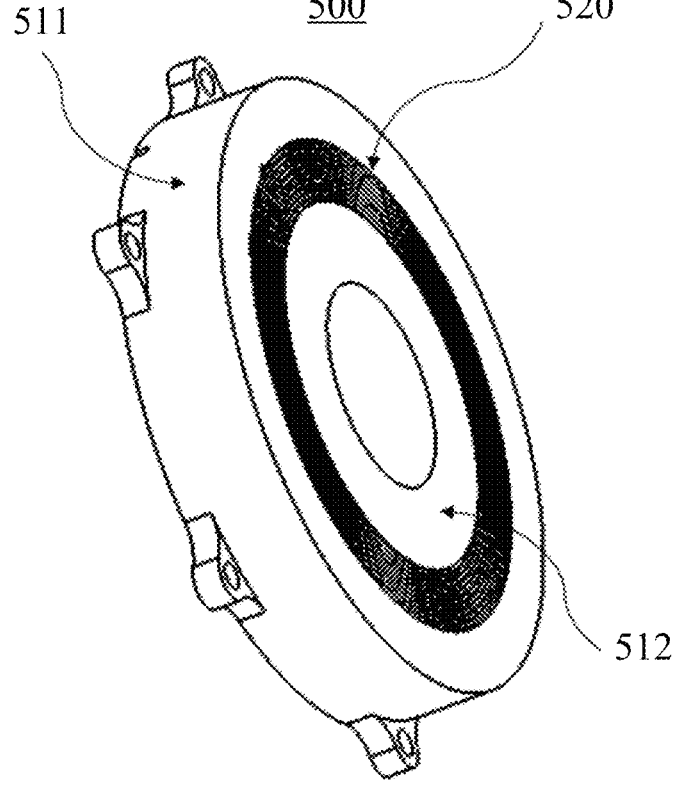
FIG. 12 is a schematic structural view of an excitation ring assembly in FIG. 10.

In other exemplary embodiments, as shown in FIG. 10 to FIG. 12, the outer ring wall 511 is opposed to the first magnetic pole cooperating portion in an axial direction of the housing, and the second air gap 620 is located between an end surface of the outer ring wall 511 and an end surface of the first magnetic pole cooperating portion. The inner ring wall 512 is opposed to the second magnetic pole cooperating portion in the axial direction of the housing, and the third air gap 630 is located between an end surface of the inner ring wall 512 and an end surface of the second magnetic pole cooperating portion. The first permanent magnet is a first radial permanent magnet steel 430. In a circumferential direction of the housing, the first magnetic pole forming section and the second magnetic pole forming section are in one-to-one correspondence and located inside a region defined by a plurality of first radial permanent magnet steels 430. The first magnetic pole forming section is provided with a magnetic isolation structure 640 at a radial inner side of the first magnetic pole forming section. The second magnetic pole forming section is provided with a magnetic passing structure 650 at a radial inner side of the second magnetic pole forming section. The second air gap 620 and the third air gap 630 each are an axial air gap. Radial outer ends of adjacent first radial permanent magnet steels 430 have different magnetic poles, and radial inner ends of the adjacent first radial permanent magnet steels 430 have different magnetic poles. The second magnetic pole protrusion 414 is disposed at a side surface of the rotor core 410 facing towards the excitation ring assembly 500, and is located at radial inner sides of the first boss 411 and the second boss 412. The second magnetic pole protrusion 414 is formed into an annular boss.

In the electric motor having the adjustable magnetic field according to the embodiments of the present disclosure, the main magnetic field is generated by the first permanent magnet and the second radial permanent magnet steel 320, the auxiliary adjustable magnetic field is generated the current of the excitation winding 520 of the excitation ring assembly 500, and the assisting magnetization and the demagnetization are determined based on the magnitude and direction of the current of the excitation winding 520. Therefore, the adjustment and control on the main magnetic field is realized. As a result, advantages such as the high torque at the low speed, the high efficiency at the high speed, and the wide operation range at the constant power can be better achieved.

In an example, as shown in FIG. 11, the magnetism isolation structure 640 is disposed at a position where a first magnetic pole of the first radial permanent magnet steel 430 at a radial inner end thereof is located. The magnetism passing structure 650 is disposed at a position where a second magnetic pole of the first radial permanent magnet steel 430 at the radial inner end thereof is located (i.e., no magnetism isolation structure is provided). The magnetic isolation structure 640 may be formed into a magnetic isolation groove, and the first radial permanent magnet steel 430 may be formed into a V-type permanent magnet steel.

In an example, the end surface of the first magnetic pole cooperating portion 413 is flush or non-flush with the end surface of the second magnetic pole cooperating portion 414. The end surface of the inner ring wall 512 is flush or non-flush with the end surface of the outer ring wall 511 (in conjunction with FIG. 11 and FIG. 12 for understanding).

A detailed description will be given below by taking an example in which the first magnetic pole is an N pole and the second magnetic pole is an S pole. In some other embodiments, the first magnetic pole may be an S pole and the second magnetic pole may be an N pole, which can also achieve the object of the present disclosure, and the purpose thereof does not depart from the design idea of the present disclosure. Thus, details thereof will be omitted herein, and should also fall within the scope of the present disclosure.

Figure 6:
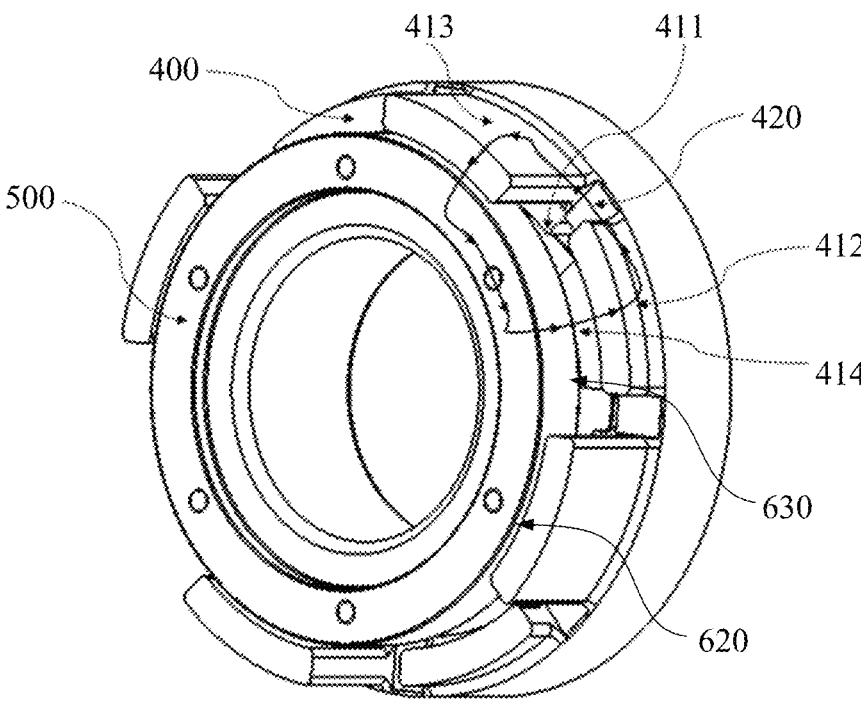
FIG. 6 is a schematic structural view of a leakage magnetic flux path of an excitation rotor.

When the excitation winding 520 is not energized, as shown in FIG. 5, from one side of the first radial permanent magnet steel 430 (the N pole), a part of permanent magnetic flux generated by the first magnetic pole of the first radial permanent magnet steel 430 on the excitation rotor 400 at the radial outer end thereof passes through passes through the first boss 411, the first air gap 610, a stator tooth portion, a stator yoke portion, an adjacent stator tooth portion, and the first air gap 610 to reach an adjacent second boss 412, then reaches the other side (the S pole) of the tangential permanent magnet steel 420, thereby forming a closed magnetic circuit loop. As shown in FIG. 6, from one side (the N pole) of the first radial permanent magnet steel 430 (the N pole), another part of the permanent magnetic flux passes through the first boss 411, the first magnetic pole protrusion 413, the second air gap 620, the outer ring wall 511, the inner ring wall 512, the third air gap 630, the second magnetic pole protrusion 414 to reach the second boss 412, and then reaches the other side (the S pole) of the tangential permanent magnet steel 420, thereby forming a closed magnetic circuit loop (in conjunction with FIG. 6 for understanding).

When the excitation winding 520 is not energized, from the first magnetic pole 321 of the second radial permanent magnet steel 320 at the radial outer end thereof, a part of the magnetic flux generated by the second radial permanent magnet steel 320 on the permanent magnet rotor 300 passes through the first air gap 610, the stator tooth portion, the stator yoke portion, the adjacent stator tooth portion, and the first air gap 610 to reach the second magnetic pole 322 of the adjacent second radial permanent magnet steel 320 at the radial outer end thereof, and then passes through the rotor yoke portion of the permanent magnet rotor 300, thereby forming a closed magnetic circuit loop (in conjunction with FIG. 7 for understanding). Another part of the magnetic flux passes through the first boss 411, the first magnetic pole protrusion 413, the second air gap 620, the outer ring wall 511, the inner ring wall 512, the third air gap 630, and the second magnetic pole protrusion 414 to reach the second boss 412, and then passes through the second magnetic pole of the second radial permanent magnet steel 320 at the radial inner end thereof and the rotor yoke portion of the permanent magnet rotor 300, thereby forming a closed magnetic circuit loop.

Magnetic flux passing through the second air gap 620 and the third air gap 630 is leakage magnetic flux. A magnetic flux path extending through the second air gap 620 and the third air gap 630 is a leakage magnetic flux path. Magnetic flux passing through the first air gap 610 participates in external energy conversion and outputs torque to an external environment. In addition, the magnetic flux (i.e. leakage magnetic flux) passing through the second air gap 620 and the third air gap 630 does not participate in the external energy conversion, and does not output the torque to the external environment. Herein, the setting may be adjusted as desired to allow both the second air gap 620 and the third air gap 630 to be smaller than the first air gap 610. Based on a principle of magnetic resistance minimization, a larger part of the permanent magnetic flux is closed through the leakage magnetic flux path. In some other embodiments, settings are adjusted as desired to allow the second air gap 620 and the third air gap 630 to be greater than or equal to the first air gap 610. The electric motor having adjustable magnetic flux according to the embodiments of the present disclosure can provide a normally open leakage magnetic flux path to allow the permanent magnetic flux generated by the first radial permanent magnet steel 430 of the excitation rotor 400 and permanent magnetic flux generated by the second radial permanent magnet steel 320 of the permanent magnet rotor 300 to be discharged through the leakage magnetic flux path.

When the excitation winding 520 is energized forwardly to form the outer ring wall 511 as the first magnetic pole, on the one hand, a magnetic field generated by an excitation current of the excitation winding 520 will inhibit the leakage magnetic flux path, which is equivalent to controlling and adjusting an opening size of the normally open leakage magnetic flux path. When the excitation current is relatively large, the leakage magnetic flux path is closed. On the other hand, the magnetic flux generated by the excitation current passes through the outer ring wall 511, the second air gap 620, the first magnetic pole protrusion 413, the first boss 411, the first air gap 610, the stator tooth potion, the stator yoke portion, the adjacent stator tooth portion, the first air gap 610, the second boss 412, the second magnetic pole protrusion 414, the third air gap 630, and the inner ring wall 512 to reach the outer ring wall 511, thereby forming a closed magnetic circuit loop (in conjunction with FIG. 8 for understanding). In this case, for the first air gap 610, a magnetic field direction of the magnetic flux generated by the excitation current is the same as a magnetic field direction of the permanent magnetic flux generated by the first radial permanent magnet steel 430 of the excitation rotor 400, thereby providing magnetization increasing. In this way, a torque output is greatly improved, which is especially suitable for a low-speed operation condition.

When the excitation winding 520 is energized reversely to form the outer ring wall 511 as the second magnetic pole, on the one hand, the leakage magnetic flux path is widened and expanded by the magnetic field generated by the excitation current, and therefore the opening size of the leakage magnetic flux path becomes larger, and more permanent magnetic flux passes through the leakage magnetic flux path, thereby forming a closed magnetic circuit loop. On the other hand, the magnetic flux generated by the excitation current passes through the inner ring wall 512, the third air gap 630, the second magnetic pole protrusion 414, the second boss 412, the first air gap 610, the stator tooth portion, the stator yoke portion, the adjacent stator tooth portion, the first air gap 610, the first boss 411, the first magnetic pole protrusion 413, the second air gap 620, and the outer ring wall 511 to reach the inner ring wall 512, thereby forming a closed magnetic circuit loop (in conjunction with FIG. 9 for understanding). In this case, for the first air gap 610, the magnetic field generated by the excitation current has an opposite direction to the permanent magnetic field generated by the permanent magnetic flux of the excitation rotor 400, thereby providing the demagnetization. In this way, the main magnetic flux (i.e. the permanent magnetic flux) passing through the first air gap 610 is further reduced, realizing further adjustment of the magnetic field in the first air gap 610, which is especially suitable for an ultra-high speed operation condition.

By energizing the excitation winding 520 of the excitation ring assembly 500, the electric motor having the adjustable magnetic field realizes the opening and closing of the leakage magnetic flux path and the adjustment of the opening size of the leakage magnetic flux path, which indirectly realizes the adjustment of the magnetic field at the first air gap 610. When a high torque output is required at a low speed, the excitation current is a forward current, and the excitation current provides the magnetization increasing to improve the intensity of the magnetic field at the first air gap 610, thereby further improving the output torque. At a high speed, the leakage magnetic flux path may be normally opened as desired, for example, when a zero excitation current is required. In this case, the permanent magnetic flux of the permanent magnet rotor 300 and the permanent magnetic flux of the excitation rotor 400 are discharged through the leakage magnetic flux path to reduce the magnetic flux passing through the first air gap 610. In this way, the main magnetic flux passing through the first air gap 610 is weakened without any input current, thereby completing the weakening of the permanent magnetic flux passing through the first air gap 610 without external input. Therefore, the electric motor can operates more efficiently (i.e. when the excitation current is zero, the permanent magnetic flux of permanent magnet rotor 300 and the permanent magnetic flux of excitation rotor 400 pass through the leakage magnetic flux path, which split the main magnetic flux passing through the first air gap 610, thereby indirectly realizing the weakening of the main magnetic flux passing through the first air gap 610, that is, the weakening of the main magnetic flux is realized when the excitation current is zero, which facilitates improving operation efficiency in a high-speed region). When a rotation speed is further increased, the excitation current is a reverse current, and the excitation current provides the demagnetization, which further weakens the magnetic flux passing through the first air gap 610, thereby realizing the weakening of the magnetic flux. In this way, an operating range of the electric motor can be significantly improved, realizing a constant power operation in a wide speed regulation range.

A vehicle (not shown) according to embodiments of the present disclosure includes the electric motor having the adjustable magnetic field as described in any one of the above embodiments.

The vehicle according to the embodiments of the present disclosure has all the advantages of the electric motor having the adjustable magnetic field as described in any one of the above embodiments, and the detailed description thereof will be omitted herein.

In summary, in the electric motor having the adjustable magnetic field according to the embodiments of the present disclosure, a main magnetic field is generated by the first permanent magnet and the permanent magnet rotor, an auxiliary adjustable magnetic field is generated by a current of the excitation winding of the excitation ring assembly, and assisting magnetization and demagnetization are determined based on a magnitude and direction of the current of the excitation winding, thereby achieving an adjustment and control on the main magnetic field. In this way, advantages such as high torque at a low speed, high efficiency at a high speed, and a wide operation range at a constant power can be better achieved.

In the description of the present disclosure, the orientation or the position indicated by technical terms such as "on", "below", "one side", "another side", "one end", "another end", "side", "opposite", "corners", "periphery", and "mouth-shaped structure" should be construed to refer to the orientation and the position as shown in the drawings, and is only for the convenience of describing the embodiments of the present disclosure and simplifying the description, rather than indicating or implying that the pointed device or element must have a specific orientation, or be constructed and operated in a specific orientation, and therefore cannot be understood as a limitation of the embodiments of the present disclosure.

In the description of the embodiments of the present disclosure, unless otherwise clearly specified and limited, the terms such as "connect", "directly connect", "directly connect", "fixedly connect", "install", "assemble", and the like should be understood in a broad sense. For example, it may be a fixed connection or a detachable connection or connection as one piece. The terms "install", "connect", and "fixedly connect" may be a direct connection or indirect connection through an intermediate; internal communication of two components or the interaction relationship between two components. For those of ordinary skill in the art, the specific meaning of the above-mentioned terms in the embodiments of the present disclosure can be understood in specific circumstances.

Although the embodiments of the present disclosure are described above, the description is only for the convenience of understanding the embodiments of the present disclosure, and is not intended to limit the present disclosure. Those skilled in the art to which the present disclosure pertains may make any modifications and changes in the form and details of implementation without departing from the spirit and scope of the present disclosure, and the scope of the present disclosure shall be defined by the appended claims.

What is claimed is:

1. An electric motor having an adjustable magnetic field, comprising:

a housing;

a stator;

a permanent magnet rotor;

an excitation rotor; and an excitation ring assembly, wherein:

each of the stator, the permanent magnet rotor, the excitation rotor, and the excitation ring assembly is located in the housing;

the permanent magnet rotor is disposed at a radial inner side of the stator, a first air gap being formed between the permanent magnet rotor and the stator;

the excitation ring assembly is disposed at an end wall of the housing;

the excitation rotor is disposed between the excitation ring assembly and the permanent magnet rotor;

the excitation ring assembly comprises an excitation ring and an excitation winding, the excitation ring having an outer ring wall and an inner ring wall, and the excitation winding being disposed between the outer ring wall and the inner ring wall; and the excitation rotor comprises a rotor core and a plurality of first permanent magnets, the rotor core being provided with a first magnetic pole cooperating portion, a second magnetic pole cooperating portion, a first magnetic pole forming section, and a second magnetic pole forming section, wherein the first magnetic pole forming section and the second magnetic pole forming section are circumferentially arranged alternately, wherein the first magnetic pole cooperating portion corresponds to the first magnetic pole forming section, wherein the second magnetic pole cooperating portion corresponds to the second magnetic pole forming section, and wherein the plurality of first permanent magnets corresponds to the first magnetic pole forming section and the second magnetic pole forming section and is arranged on the rotor core to allow the first magnetic pole forming section to be formed as a first magnetic pole and allow the second magnetic pole forming section to be formed as a second magnetic pole, the outer ring wall corresponds to the first magnetic pole cooperating portion, a second air gap being defined by the outer ring wall and the first magnetic pole cooperating portion; and the inner ring wall corresponds to the second magnetic pole cooperating portion, a third air gap being defined by the inner ring wall and the second magnetic pole cooperating portion.

2. The electric motor according to claim 1, wherein:

the outer ring wall is located at a radial inner side of the first magnetic pole cooperating portion;

the second air gap is located between a radial outer surface of the outer ring wall and a radial inner surface of the first magnetic pole cooperating portion;

the inner ring wall is located at a radial inner side of the second magnetic pole cooperating portion;

the third air gap is located between a radial outer surface of the inner ring wall and a radial inner surface of the second magnetic pole cooperating portion;

each of the plurality of first permanent magnets comprises a tangential permanent magnet steel arranged between the first magnetic pole forming section and the second magnetic pole forming section.

3. The electric motor according to claim 2, wherein:

the first magnetic pole forming section and the second magnetic pole forming section are both located at a side surface of the rotor core facing towards the excitation ring assembly;

the inner ring wall protrudes towards the rotor core relative to the outer ring wall;

the first magnetic pole cooperating portion is disposed at an end surface of the first magnetic pole forming section; and the second magnetic pole cooperating portion is disposed at a radial inner surface of the second magnetic pole forming section.

4. The electric motor according to claim 3, wherein:

the first magnetic pole cooperating portion comprises a first magnetic pole protrusion; and the second magnetic pole cooperating portion comprises a second magnetic pole protrusion.

5. The electric motor according to claim 1, wherein:

the outer ring wall is opposed to the first magnetic pole cooperating portion in an axial direction of the housing;

the second air gap is located between an end surface of the outer ring wall and an end surface of the first magnetic pole cooperating portion;

the inner ring wall is opposed to the second magnetic pole cooperating portion in the axial direction of the housing;

the third air gap is located between an end surface of the inner ring wall and an end surface of the second magnetic pole cooperating portion; and each of the plurality of first permanent magnet comprises a first radial permanent magnet steel, in a circumferential direction of the housing, the first magnetic pole forming section and the second magnetic pole forming section being in one-to-one correspondence and located inside a region defined by a plurality of first radial permanent magnet steels.

6. The electric motor according to claim 5, wherein:

the first magnetic pole forming section is provided with a magnetism isolation structure at a radial inner side of the first magnetic pole forming section; and the second magnetic pole forming section is provided with a magnetism passing structure at a radial inner side of the second magnetic pole forming section.

7. The electric motor according to claim 5, wherein:

the first magnetic pole forming section and the second magnetic pole forming section are both located at a side surface of the rotor core facing towards the excitation ring assembly;

the first magnetic pole cooperating portion is disposed at an end surface of the first magnetic pole forming section; and the second magnetic pole cooperating portion is disposed at a side surface of the rotor core facing towards the excitation ring assembly, and is located at radial inner sides of the first magnetic pole forming section and the second magnetic pole forming section.

8. The electric motor according to claim 7, wherein:

the end surface of the first magnetic pole cooperating portion is flush or non-flush with the end surface of the second magnetic pole cooperating portion; and the end surface of the inner ring wall is flush or non-flush with the end surface of the outer ring wall.

9. The electric motor according to claim 7, wherein:

the first magnetic pole cooperating portion comprises a first magnetic pole protrusion; and the second magnetic pole cooperating portion comprises a second magnetic pole protrusion.

10. The electric motor according to claim 1, wherein the permanent magnet rotor comprises a permanent magnet rotor core and a plurality of second permanent magnets, the plurality of second permanent magnets being circumferentially arranged on the permanent magnet rotor core sequentially.

11. The electric motor according to claim 10, wherein each of the plurality of the second permanent magnets comprises a second radial permanent magnet steel, radial outer ends of adjacent second radial permanent magnet steels having different magnetic poles, radial inner ends of the adjacent second radial permanent magnet steels having different magnetic poles, and a magnetism isolation structure being arranged at each position where a first magnetic pole and a second magnetic pole of the adjacent second radial permanent magnet steels at radial inner ends of the adjacent second radial permanent magnet steels are located.

12. The electric motor according to claim 1, wherein:
two excitation ring assemblies are provided; and
two excitation rotors are provided, the permanent magnet rotor being located between the two excitation rotors, and the two excitation rotors being located between the two excitation ring assemblies.

13. A vehicle, comprising the electric motor according to claim 1.

14. The vehicle according to claim 13, wherein:
the outer ring wall is located at a radial inner side of the first magnetic pole cooperating portion;
the second air gap is located between a radial outer surface of the outer ring wall and a radial inner surface of the first magnetic pole cooperating portion;
the inner ring wall is located at a radial inner side of the second magnetic pole cooperating portion;
the third air gap is located between a radial outer surface of the inner ring wall and a radial inner surface of the second magnetic pole cooperating portion;
each of the plurality of first permanent magnets comprises a tangential permanent magnet steel arranged between the first magnetic pole forming section and the second magnetic pole forming section.

15. The vehicle according to claim 14, wherein:
the first magnetic pole forming section and the second magnetic pole forming section are both located at a side surface of the rotor core facing towards the excitation ring assembly;
the inner ring wall protrudes towards the rotor core relative to the outer ring wall;
the first magnetic pole cooperating portion is disposed at an end surface of the first magnetic pole forming section; and
the second magnetic pole cooperating portion is disposed at a radial inner surface of the second magnetic pole forming section.

16. The vehicle according to claim 15, wherein:
the first magnetic pole cooperating portion comprises a first magnetic pole protrusion; and
the second magnetic pole cooperating portion comprises a second magnetic pole protrusion.

17. The vehicle according to claim 13, wherein:
the outer ring wall is opposed to the first magnetic pole cooperating portion in an axial direction of the housing;
the second air gap is located between an end surface of the outer ring wall and an end surface of the first magnetic pole cooperating portion;
the inner ring wall is opposed to the second magnetic pole cooperating portion in the axial direction of the housing;
the third air gap is located between an end surface of the inner ring wall and an end surface of the second magnetic pole cooperating portion; and
each of the plurality of first permanent magnet comprises a first radial permanent magnet steel, in a circumferential direction of the housing, the first magnetic pole forming section and the second magnetic pole forming section being in one-to-one correspondence and located inside a region defined by a plurality of first radial permanent magnet steels.

18. The vehicle according to claim 17, wherein:
the first magnetic pole forming section is provided with a magnetism isolation structure at a radial inner side of the first magnetic pole forming section; and
the second magnetic pole forming section is provided with a magnetism passing structure at a radial inner side of the second magnetic pole forming section.

19. The vehicle according to claim 17, wherein:
the first magnetic pole forming section and the second magnetic pole forming section are both located at a side surface of the rotor core facing towards the excitation ring assembly;
the first magnetic pole cooperating portion is disposed at an end surface of the first magnetic pole forming section; and
the second magnetic pole cooperating portion is disposed at a side surface of the rotor core facing towards the excitation ring assembly, and is located at radial inner sides of the first magnetic pole forming section and the second magnetic pole forming section.

20. The vehicle according to claim 19, wherein:
the end surface of the first magnetic pole cooperating portion is flush or non-flush with the end surface of the second magnetic pole cooperating portion; and
the end surface of the inner ring wall is flush or non-flush with the end surface of the outer ring wall.

\*   \*   \*   \*   \*